United States Patent [19]

Gillis et al.

[11] Patent Number: 4,933,416

[45] Date of Patent: Jun. 12, 1990

[54] POLYISOCYANATE COMPOSITIONS

[75] Inventors: Herbert R. Gillis, Sterrebeek; Eduard F. Cassidy, Ukkel; Alain Parfondry, Evere; Jan W. Leenslag, Neerijse, all of Belgium

[73] Assignees: ICI Americas Inc; Imperial Chemical Industries PLC, both of Wilmington, Del.

[21] Appl. No.: 164,393

[22] Filed: Mar. 4, 1988

[30] Foreign Application Priority Data

Mar. 11, 1987 [GB] United Kingdom ................. 8705801

[51] Int. Cl.$^5$ ....................... C08G 18/12; C08G 18/40
[52] U.S. Cl. ..................................... 528/74.5; 528/76; 528/77; 528/80; 528/81; 528/83; 528/84; 528/85
[58] Field of Search ................... 528/74.5, 76, 77, 80, 528/81, 83, 84, 85

[56] References Cited

U.S. PATENT DOCUMENTS

| | | |
|---|---|---|
| 3,256,213 | 6/1966 | Gmitter et al. |
| 3,441,588 | 4/1969 | Wagner et al. |
| 3,682,867 | 8/1972 | Shackelford et al. |
| 3,789,045 | 1/1974 | Coury et al. |
| 3,892,696 | 7/1975 | Wood |
| 3,897,585 | 7/1975 | Wood |
| 3,979,364 | 9/1976 | Rowton |
| 4,530,941 | 7/1985 | Turner et al. ............. 521/176 |
| 4,554,299 | 11/1985 | Liggett |
| 4,677,136 | 6/1987 | Rasshafer et al. ........... 521/159 |
| 4,686,242 | 8/1987 | Turner et al. |
| 4,705,814 | 11/1987 | Grigsby, Jr. et al. ........ 521/159 |
| 4,719,278 | 1/1988 | Wellner et al. ............. 528/64 |
| 4,720,536 | 1/1988 | House et al. ............... 528/60 |

FOREIGN PATENT DOCUMENTS 149765 of 0000 European Pat. Off.
1286246 of 0000 United Kingdom.

OTHER PUBLICATIONS

U.S. Patent Application #160,647 (Gillis & Hannaby), pp. 15–17.
English (Derwent) Abstract for DE3411216.
Bock et al.; ACS-PMSE preprints; Fall-1986 meeeting; pp. 448–456.
U.S. Ser. No. 07/163,922 filed Mar. 4, 1988.

*Primary Examiner*—Maurice J. Welsh
*Assistant Examiner*—Rabon Sergent
*Attorney, Agent, or Firm*—Richard A. Rowe

[57] ABSTRACT

A polyisocyanate composition comprising a reaction product of a stoichiometric excess of an organic polyisocyanate and:

(i) a polymeric polyol having an average nominal hydroxyl functionality greater than 2 and an average hydroxyl equivalent weight of from about 500 to about 5000, and (ii) a polymeric polyamine having an average nominal primary and/or secondary amino functionality of from about 2 to about 3 and an average amine equivalent weight of from about 500 to about 5000, the polyol and the polyamine having glass transition temperatures below room temperature. The composition is especially useful in the production of elastomers by the RIM process.

18 Claims, No Drawings

POLYISOCYANATE COMPOSITIONS

This invention relates to polyisocyanate compositions, to methods for their manufacture and to their use in the production of useful macromolecular materials.

The manufacture of macromolecular materials based on organic polyisocyanates and active hydrogen containing compounds has been well established for more than thirty years. Thus, polyurethanes of various types, flexible or rigid, cellular or non-cellular, are made by suitably formulating polyisocyanates and polyols whilst polyureas or polyurea-polyurethanes are obtained by using polyamines in place of or in addition to polyols.

In many of the established manufacturing processes it is preferred to employ a one-shot system whereby the polyisocyanate and active hydrogen compounds are converted to the final product in a single reaction step. In other well known processes an intermediate product, usually called a prepolymer, is first formed by reacting a stoichiometric excess of the polyisocyanate with active hydrogen compound and is subsequently converted to the final product in a second reaction involving further active hydrogen compound.

Whilst prepolymer processes are apparently less convenient than one-shot systems, in many cases they offer significant advantages. Thus, in general, it is preferred for processing convenience to use polyisocyanate and active hydrogen components that are homogeneous liquids at room temperatures. Unfortunately, one of the most commonly used polyisocyanates, 4,4'-diphenylmethane diisocyanate, is a solid at normal ambient temperatures as is its 2,4'-isomer but many prepolymers made therefrom are stable liquids used in the production of foams, elastomers and the like. In addition to their usefulness in providing liquid components, prepolymers frequently provide a more controllable or desirable balance of reactions than is provided by the corresponding one-shot system and so offer further processing advantages. Accordingly, prepolymers derived from various aliphatic, cycloaliphatic or aromatic polyisocyanates find use in the production of solid and microcellular elastomers, flexible and rigid foams, coatings, adhesives and the like.

One of the more important methods of making isocyanate based cellular or non-cellular elastomers is the technique known as reaction injection moulding (RIM) whereby two highly reactive liquid streams are impingement mixed and rapidly injected into a mould cavity. The two streams generally comprise a polyisocyanate or derivative thereof, usually known as the "A" component, and an isocyanate-reactive stream, known as the "B" component, commonly containing polyol and/or polyamine reactants.

When a prepolymer is employed as the "A" component, it can be the reaction product of an excess of polyisocyanate with either a polyol or a polyamine. In some respects, the elastomers obtained from polyol-based prepolymers are superior to those prepared from polyamine-based prepolymers; in other respects, the opposite is the case, both systems having advantages and disadvantages.

It has now been found that certain polyisocyanate compositions containing both polyol- and polyamine-based prepolymers provide polyurea-polyurethanes possessing a surprising combination of excellent properties. In particular, it has been found possible to prepare elastomers having both the high modulus values characteristics of polyamine systems and the excellent impact resistance associated with polyol based systems. Furthermore, this hitherto unobtainable combination of properties is accompanied by high tensile properties and low sag values.

Thus according to the invention, there is provided a polyisocyanate composition comprising a reaction product of a stoichiometric excess of an organic polyisocyanate and (i) a polymeric polyol having an average nominal hydroxyl functionality greater than 2 and an average hydroxyl equivalent weight of from about 500 to about 5,000, and (ii) a polymeric polyamine having an average nominal primary and/or secondary amino functionality of from about 2 to about 3 and an average amine equivalent weight of from about 500 to about 5000, the polyol and the polyamine having glass transition temperatures below room temperature.

Organic polyisocyanates which may be used in preparing the compositions of the invention include aliphatic, cycloaliphatic, araliphatic and aromatic polyisocyanates and mixtures thereof, especially diisocyanates. For most purposes, it is preferred to use aromatic polyisocyanates or polyisocyanate mixtures in which an aromatic polyisocyanate is the major component.

Examples of suitable polyisocyanates include ethylene diisocyanate, 1,6-hexamethylene diisocyante, isophorone diisocyanate, cyclohexane-1,4-diisocyanate, 4,4'-dicyclohexylemethane diisocyanate,p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyante, polymethylene polyphenylene polyisocyanates and 1,5-naphthylene diisocyanate. For some purposes, for example when the polyisocyanate compositions are to be used in the production of elastomers, the preferred polyisocyanates are the available MDI isomers, that is to say 4,4'-diphenylemethane diisocyanate, 2,4'-diphenylmethane diisocyanate, and mixtures thereof. There may also be used modified polyisocyanates, for example MDI variants such as uretonimine-modified MDI, either alone or in admixture with other polyisocyanates.

The term "nominal hydroxyl functionality" as used above in defining the polymeric polyol used in making the polyisocyanate compositions of the invention means the hydroxyl functionality that a polymeric polyol would be expected to have having regard to its monomeric components. For example, a polyether prepared by the addition of propylene oxide to a glycol will have a nominal hydroxyl functionality of 2 although, in practice, its average functionality will be somewhat less than 2. Thus, for a polyether, the average nominal hydroxyl functionality is the average functionality (number of active hydrogen atoms) of the initiator or initiators used in its preparation.

The average nominal hydroxyl functionality of the polyol used in preparing the polyisocyanate compositions of the invention is typically from 2.5 to 4, for example about 3, when the compositions are to be used for elastomer production but higher functionalities are not excluded, especially when the compositions are to be employed in the manufacture of more highly cross-linked products. The average hydroxyl equivalent weight of the polyol is preferably in the range from 800 to 2000. Mixtures of two or more polyols varying in functionality, equivalent weight or chemical constitution may be used provided such mixture conform to the average functionality and average equivalent weight criteria displayed above.

Polymeric polyols having average hydroxyl functionalities greater than 2, average hydroxyl equivalent weights in the range 500 to 5000 and glass transition temperatures below room temperature are well known as polyurethane components and may be prepared by methods fully described in the prior art. As examples of suitable polyols there may be mentioned polythioethers, polyesters, polyesteramides, polycarbonates, polyacetals, polyolefins, polysiloxanes and, especially, polyethers.

Polyether polyols which may be used include products obtained by the polyaddition of one or more alkylene oxides to initiators having three or more active hydrogen atoms. Such polyethers may be used in conjunction with polyether diols in appropriate proportions so that the polyol mixture has the desired overall functionality. Thus, suitable polyether polyols or mixtures of polyols may be selected from the reaction products of propylene oxide or propylene and ethylene oxides with polyfunctional initiators such as water, ethylene glycol, propylene glycol, diethylene glycol, glycerol, trimethylolpropane, pentaerythritol or sorbitol. Especially useful polyethers include polyoxypropylene triols and poly(oxyethylene-oxypropylene) triols obtained by the simultaneous or sequential addition of ethylene and propylene oxides to trifunctional initiators. In some cases, ethylene oxide tipped triols are preferred because of their enhanced reactivity. Mixtures of triols with corresponding polyether diols are also very useful.

Polyester polyols which may be used in preparing the polyisocyanate compositions include hydroxyl terminated reaction products of polyhydric alcohols such as ethylene glycol, propylene glycol, diethylene glycol, neopentyl glycol, 1,4-butanediol, glycerol, trimethylolpropane or pentaerythritol with polycarboxylic acids, especially dicarboxylic acids or their ester-forming derivatives, for example succinic, glutaric and adipic acids or their dimethyl esters, phthalic anhydride or dimethyl terephthalate, the starting materials being chosen in known manner to give polyesters of the desired functionality.

Polyesters obtained by the polymerization of lactones, for example caprolactone, in the presence of a polyol, may also be used. Polyesteramides may be obtained by the inclusion of aminoalcohols such as ethanolamine or polyamines such as ethylene diamine in polyesterification mixtures.

The term "nominal primary and/or secondary amino functionality" as used above in defining the polymeric polyamine used in making the polyisocyanate compositions of the invention means the amino functionality that a polymeric polyamine would be expected to have having regard to the materials used in its manufacture. For example, a polyether polyamine prepared by the reductive amination of a polyether diol will have a nominal amino functionality of 2 although, in practice, the average hydroxyl functionality of the diol will be somewhat less than 2 and the conversion of hydroxyl to amino groups will not be entirely complete. It is preferred that at least 70%, and most preferably at least 85%, of the functional groups are primary or secondary amino groups. For most purposes, polymeric polyamines in which at least 70% of the amino groups are primary amino groups are preferred.

The average nominal amino functionality of the polyamine used in preparing the polyisocyanate compositions of the invention is preferably in the range from 2.5 to 3. The average amino equivalent weight of the polyamine is preferably in the range from 800 to 2000, especially from 800 to 1700. Mixtures of two or more polyamines varying in functionality, equivalent weight or chemical constitution may be used provided such mixtures conform to the average functionality and average equivalent weight criteria displayed above.

Polymeric polyamines having average amino functionalities of 2 or more, average amino equivalent weights in the range 500 to 5000 and glass transition temperatures below room temperature are well known as components of polyurea and polyurea-polyurethane formulations and may be prepared by methods fully described in the prior art. As examples of suitable polyols there may be mentioned amino-terminated polythioethers, polyesters, polyesteramides, polycarbonates, polyacetals, polyolefins, polysiloxanes and, especially, polyethers.

Polyether polyamines which may be used include products obtained by the reductive amination of polyether polyols as described, for example, in U.S. Pat. No. 3,654,370. Polyether polyamines may also be prepared by the cyanoethylation of polyols followed by hydrogenation.

Polyoxypropylene diamines and triamines and poly(oxyethylene-oxypropylene) diamines and triamines and mixtures of any of these are preferred.

The excess of organic polyisocyanate used in preparing the polyisocyanate compositions of the invention is suitably such that the compositions have free NCO contents in the range from 8% to 25%, and especially from 12% to 20%, by weight.

The polyisocyanate compositions may be prepared by reacting the organic polyisocyanate with the polymeric polyol and the polymeric polyamine in any convenient matter. Thus, a stoichiometric excess of the polyisocyanate may be reacted with a mixture of polyol and polyamine, or, alternatively, the polyisocyanate may be reacted in excess quantities separately with the polyol and the polyamine to form an isocyanate terminated polyol based prepolymer and an isocyanate terminated polyamines based prepolymer which are subsequently mixed. The polyisocyanate may also be reacted with the polyol and the polyamine sequentially in either order. Compositions prepared by reacting the excess of polyisocyanate with a mixture of the polyol and the polyamine or, sequentially, with the polyol and the polyamine or with the polyamine and the polyol are preferred for use in the production of elastomers having excellent flexural modulus, impact resistance and thermal stability. Compositions prepared by reacting the excess of polyisocyanate first with the polyol to form an isocyanate terminated polyol based prepolymer which is then reacted with the polyamine are particularly suitable for certain applications. Where the compositions are prepared by mixing two prepolymers, it is not essential that both prepolymers have the same NCO content. It is possible, for example, to blend a polyol based prepolymer having a relatively low NCO content with a polyamine based prepolymer having a relatively high NCO content. Furthermore, compositions can be prepared having low NCO contents which may then be raised by the addition of further organic polyisocyanate which may be the same as or different from the polyisocyanate used in preparing the composition.

In preparing the polyisocyanate compositions, reaction between the organic polyisocyanate and the polyol and polyamine may be effected using conditions that have been fully described in the prior art for the production of prepolymers. Thus, in a typical reaction, a stoichiometric excess of the organic polyisocyanate is reacted separately, simultaneously or sequentially with one or more polyols and one or more polyamines under substantially anhydrous conditions at temperatures between about 30° C. and about 130° C., preferably from 60° C. 110° C., until reaction between the isocyanate groups and the hydroxyl and amino groups is substantially complete.

To achieve the desired NCO contents, the polyisocyanate and active hydrogen compounds are suitably reacted in such proportions that the ratio of NCO groups to hydroxyl or amino groups is in the range from about 4.5:1 to about 35:1, preferably within the range of from 7.0:1 to 17.5:1. Regardless of the preparative method used, the relative proportions of polyol and polyamine generally correspond to an initial hydroxyl/amino group ratio in the range from 5:95 to 95:5, preferably from 25:75 to 75:25 and most preferably from 35:65 to 65:35.

If desired, catalysts may be used to assist production of the polyisocyanate compositions. Suitable catalysts are known in the polyurethane and polyurea art and include tin compounds such as dibutyltin dilaurate and stannous octoate and tertiary amines such as triethylene diamine. Also, depending upon the ultimate use to which the compositions are to be put, they may if desired contain inert solvents which may be added before or after reaction. Suitable solvents include N-methyl-pyrrolidone and methyl ethyl ketone. Such solvents may be useful in coating compositions but are less desirable when the compositions are to be used in the production of elastomers or foams.

The polyisocyanate compositions of the invention may be used in the production of polyurea-polyurethane macromolecular materials using techniques and items of processing equipment that have been fully described in the prior art. In general, the compositions are reacted with compounds containing a plurality of active hydrogen atoms, especially polymeric and/or low molecular weight polyols and/or polyamines optionally in the presence of conventional auxiliaries or additives, for example urethane catalysts, trimerisation catalysts, foaming agents, foam-stabilizing agents, surfactants, fire-retardants, fillers, dyes, pigments, mould release agents and the like.

The compositions are of particular value in the production of moulded elastomers by the RIM technique, the compositions being reacted as "A" components with typical "B" components, for example polyols and/or polyamines, especially diols, diamines and imino-functional compounds having equivalent weights less than 500, preferably less than 250, such low equivalent weight materials optionally being used in conjunction with higher equivalent weight polyols, polyamines and imino-functional compounds. In this connection, the expression "imino-functional compounds" includes not only simple imines, such as may be obtained by reacting low or high molecular weight aliphatic polyamines with aldehydes or ketones, but also the corresponding oxazolines, imidazolines, N-aryl imidazolines, oxazines, diazines, imino-esters, amidines, imidines, isoureas and guanidines, as disclosed in copending patent application No. [D1839-A] filed Feb. 26, 1988, the disclosure of which is herein incorporated by reference.

As examples of especially useful "B" components for reacting with the polyisocyanate compositions of the invention, there may be mentioned mixtures of aliphatic polyamines, especially diamines, and aromatic polyamines, especially sterically hindered diamines. Low molecular weight polyether diamines are examples of suitable aliphatic polyamines whilst suitable aromatic diamines include 3,5-diethyl-2,4-toluene diamine, 3,5-diethyl-2,6-toluene diamine and mixtures thereof, 4,4'- and 2,4'-diaminodiphenylmethanes and mixtures thereof, 2,4- and 2,6-diaminotoluenes and mixtures thereof, 1,3,5-triisopropyl-2,4-diaminobenzene, 3,3', 5,5'-tetraisopropyl-4,4'-diaminodiphenylmethane and the like.

A particularly useful "B" component comprises a mixture of an aliphatic diamine having an equivalent weight less than 250, for example a polyether diamine such as a polyoxypropylene diamine, and an aromatic diamine such as a diethyl toluene diamine as mentioned above.

Conventional techniques and equipment may be employed when using the polyisocyanate compositions in the RIM process. In typical formulations, the relative proportions of the "A" and "B" components will be such that the ratio of isocyanate equivalents in the "A" stream to isocyanate-reactive functional groups in the "B" stream is between 0.70 and 1.50, preferably from 0.90 to 1.20 and more preferably from 0.95 to 1.15.

The invention is illustrated but not limited by the following Examples in which all parts, percentages and ratios are by weight unless otherwise indicated. In the Examples, Flexural Modulus was determined by ASTM D790; Heat Sag was determined by ASTM D3769-85 and Impact (falling weight) was determined by ASTM D3029-84.

The following glossary of materials is included to identify reaction components not otherwise identified in the Examples.

GLOSSARY

Polyether Polyol 1 is an ethylene oxide capped polyoxypropylene triol having an ethylene oxide content of approximately 15%, a hydroxyl number of 32 and a hydroxyl equivalent weight of 1750.

Polyether Polyol 2 is a polyoxypropylene diol having a hydroxyl number of 56 and a hydroxyl equivalent weight of 1000.

Polyamine D-400 is a polyoxypropylene diamine having an amine equivalent weight of 200, commercially available from Texaco Chemical Corporation as Jeffamine D-400.

Polyamine D-2000 is a polyoxypropylene diamine having an amine equivalent weight of 1000, commercially available from Texaco Chemical Corporation as Jeffamine D-2000.

Polyamine T-3000 is polyoxypropylene triamine having an amine equivalent weight of 1000, commercially available from Texaco Chemical Corporation as Jeffamine T-3000.

Polyamine T-5000 is a polyoxypropylene triamine having an amine equivalent weight of 1666, commercially available from Texaco Chemical Corporation as Jeffamine T-5000.

Polyisocyanate 1 is an 80/20 mixture of 4,4'- and 2,4'-diphenylmethane diisocyanates, having an NCO-content of 33.56% by weight.

Polyisocyanate 2 is a uretonimine-modified variant of Polyisocyanate 1 having an NCO content of 31%.

Polyisocyanate 3 is a uretonimine-modified variant of pure 4,4'-diphenylmethane having an NCO content of 29.1%.

DETDA is a mixture consisting of about 80% 3,5-diethyl-2,4-diaminotoluene and 20% 3.5-diethyl-2,6-diaminotoluene, commercially available from Ethyl Corporation.

"B" Component 1 is a mixture consisting of 50 parts of Polyamine D-400, 50 parts of DETDA and 3.5 parts of catalyst and internal mold release agent.

"B" Component 2 is a mixture consisting of 50 parts of cyclohexanone diimine of Polyamine D-400, 50 parts of DETDA and 2.5 parts of catalyst and internal mold release agent.

"B" Component 3 is a mixture consisting of 50 parts of Polyamine D-400, 50 parts of DETDA and 2.5 parts of catalyst and internal mold release agent.

"B" Component 4 is a mixture consisting of 60 parts of Polyether Polyol 2 and 40 parts of DETDA.

EXAMPLE 1

Prepolymer 1A (PP-1A) was prepared by adding 53 parts (0.0302 equiv.) of Polyether Polyol 1 to 47 parts (0.376 equiv.) of Polyisocyanate 1 being stirred at 80° C. The addition was performed at such a rate that the reaction temperature was maintained at 80°±3° C. After addition of the polyol was complete, reaction was allowed to continue at this temperature for 90 minutes. The prepolymer, after cooling to room temperature, had an NCO content of 14.5%. Prepolymer 1B (PP-1B) was prepared by adding 50.5 parts (0.0505 equiv.) of Polyamine D-2000 slowly and carefully to 49.5 parts (0.395 equiv.) of Polyisocyanate 1 being stirred at 80° C. After completing the addition at 80°±3° C., the reaction was continued for a further 15 minutes at this temperature. The prepolymer, after cooling to room temperature, had an NCO content of 14.1%.

Polyisocyanate Composition 1 (PC-1), having an NCO content of 14.3%, was prepared by blending 50 parts of Prepolymer 1A with 50 parts of Prepolymer 1B. This composition was based upon a polyamine and a polyol at an NH$_2$/OH equivalents ratio of 1.672. The two prepolymers and the polyisocyanate composition were used in the preparation of elastomers by reaction with "B" Component 1 at an NCO index of 105, both streams being injected at a temperature of 40°–45° C. and a pressure of 200 bars using a RIMSTAR 155 Krauss-Maffei RIM machine and an mould temperature of 105° C. The elastomers were post-cured at 160° C. for 30 minutes immediately after preparation. Further details and elastomer properties are given in the following Table:

| "A" Component | PP-1A | PP-1B | PC-1 |
| --- | --- | --- | --- |
| A/B ratio | 247/100 | 254/100 | 250/100 |
| Hard block (%) | 63 | 64 | 63.5 |
| Flexural Modulus (MPa) | 490 | 940 | 760 |
| Room temperature impact (Falling dart) (J) | 45 | 52 | 50 |
| −20° C. impact (J) (Falling dart) | 28 | 31 | 45 |
| Heat Sag (mm) (12 cm O/H, 160° C., 1 hour) | 9 | 1.5 | 5.5 |

A notable feature of the elastomer properties is the improved low temperature impact/Flexural Modulus - performance given by the prepolymer blend (Polyisocyanate Composition 1) compared with the results obtained from the separate prepolymers.

EXAMPLE 2

Prepolymer 2A (PP-2A), having an NCO content of 14.5%, was prepared in exactly the same way as Prepolymer 1A. Prepolymer 2B (PP-2B) was prepared by the careful addition of 43.86 parts (0.0439 equiv.) of Polyamine D-2000 to 56.14 parts (0.449 equiv.) of Polyisocyanate 1 being stirred at 80° C. After completing the addition at 80°±3° C., the reaction was continued for a further 30 minutes at this temperature. The prepolymer, after cooling to room temperature, had an NCO content of 16.2%. Polyisocyanate Composition 2 (PC-2), having an NCO content of 14.9%, was prepared by blending 75 parts of Prepolymer 2A with 25 parts of Prepolymer 2B. This composition was based upon a polyamine and a polyol at an NH$_2$/OH equivalents ratio of 0.49. The two prepolymers and the polyisocyanate composition were used in the preparation of RIM elastomers as described in Example 1 except that a Battenfeld SHK-65 RIM machine was used. Further details and elastomer properties are given in the following Table.

| "A" Component | PP-2A | PP-2B | PC-2 |
| --- | --- | --- | --- |
| A/B ratio | 247/100 | 221/100 | 240/100 |
| Hard block (%) | 63 | 76 | 66 |
| Flexural Modulus (MPa) | 496 | 961 | 585 |
| Room temperature impact (Falling dart) (J) | 34 | 30 | 29 |
| −20° C. impact (J) (Falling dart) | 28 | 14 | 29 |
| Heat Sag (mm) (12 cm O/H, 160° C., 1 hour) | 5 | 1 | 3 |

The polyisocyanate composition has again provided an excellent low temperature impact/Flexural Modulus -performance.

EXAMPLE 3

Polyisocyanate Composition 3 (PC-3), having an NCO content of 15.8%, was prepared by blending 25 parts of Prepolymer 2A with 75 parts of Prepolymer 2B. This composition was based upon a polyamine and a polyol at an NH$_2$/OH equivalents ratio of 4.33. The two prepolymers and the polyisocyanate composition were used in the preparation of RIM elastomers as described in Example 2.

| "A" Component | PP-2A | PP-2B | PC-3 |
| --- | --- | --- | --- |
| A/B ratio | 247/100 | 221/100 | 227/100 |
| Hard block (%) | 63 | 76 | 73 |
| Flexural Modulus (MPa) | 496 | 961 | 894 |
| Room temperature impact (Falling dart) (J) | 34 | 30 | 30 |
| −20° C. impact (J) (Falling dart) | 28 | 14 | 30 |
| Heat Sag (mm) (12 cm O/H, 160° C., 1 hour) | 5 | 1 | 0 |

The polyisocyanate composition has provided a better low temperature impact/Flexural Modulus-behaviour together with a lower sag value.

EXAMPLE 4

Prepolymer 4 (PP-4), having an NCO content of 18.2%, was prepared from 38.6 parts (0.0386 equiv.) of Polyamine D-2000 and 61.4 parts (0.491 equiv.) of Polyisocyanate 1 using the method described for Prepolymer 2B.

Polyisocyanate Composition 4 (PC-4), having an NCO content of 15.4%, was prepared by blending 75 parts of Prepolymer 2A with 25 parts of Prepolymer 4B. This composition was based upon a polyamine and a polyol at an $NH_2/OH$ equivalents ratio of 0.43.

The two prepolymers and the polyisocyanate composition were used in the preparation of RIM elastomers as described in Example 2.

| "A" Component | PP-2A | PP-4 | PC-4 |
| --- | --- | --- | --- |
| A/B ratio | 247/100 | 196/100 | 232/100 |
| Hard block (%) | 63 | 74 | 66 |
| Flexural Modulus (MPa) | 496 | 1105 | 715 |
| Room temperature impact (Falling dart) (J) | 34 | 3 | 40 |
| −20° C. impact (J) (Falling dart) | 28 | 2 | 40 |
| Heat Sag (mm) (12 cm O/H, 160° C., 1 hour) | 5 | 1 | 2 |

The polyisocyanate composition has again provided a better low temperature impact/Flexural Modulus-behaviour.

EXAMPLE 5

Prepolymer 5A, having an NCO content of 14.5%, was prepared from 54.16 parts (0.0308 equiv.) of Polyether 1 and 48.15 parts (0.385 equiv.) of Polyisocyanate 1 using the method described for Prepolymer 1A.

Prepolymer 5B, having an NCO content of 15.0%, was prepared from 46.48 parts (0.0465 equiv.) of Polyamine D-2000 and 53.58 parts (0.429 equiv.) of Polyisocyanate 1 using the method described for Prepolymer 2B.

Polyisocyanate Composition 5A (PC-5A), having an NCO content of 14.7%, was prepared by blending 50 parts of Prepolymer 5A with 50 parts of Prepolymer 5B. This composition was based upon a polyamine and a polyol at an $NH_2/OH$ equivalents ratio of 1.50.

Polyisocyanate Composition 5B (PC-5B), having an NCO content of 13.4%, was prepared by first adding 26.54 parts (0.0151 equiv.) of Polyether Polyol 1 to 49.94 parts (0.399 equiv.) of Polyisocyanate 1 being stirred at 80°±3° C., the addition being performed at such a rate that the reaction temperature was maintained at 80°±3° C. The temperature was then raised to 90°±3° C. and 25.38 parts (0.0253 equiv.) of Polyamine D-2000 was slowly added, maintaining the temperature at 90°±3° C. After the addition was complete, this temperature was maintained for 150 minutes.

This composition was based upon a polyamine and a polyol at an $NH_2/OH$ equivalents ratio of 1.68.

The two polyisocyanate compositions were used in the preparation of elastomers by reaction with "B" Component 2 at a mould temperature of 65° C. In other respects, the elastomers were prepared as described in Example 2. Further details and elastomer properties are given in the following Table.

| "A" Component | PC-5A | PC-5B |
| --- | --- | --- |
| A/B ratio | 221/100 | 243/100 |
| Hard block (%) | 66 | 65 |
| Flexural Modulus (MPa) | 835 | 837 |
| Room temperature impact (Falling dart) (J) | 8 | 44 |
| −20° C. impact (J) | 8 | 8 |
| (Falling dart) Heat Sag (mm) (12 cm O/H, 160° C., 1 hour) | 37 | 9.5 |

It can be seen that the composition made by the sequential reacton of MDI with polyol and polyamine has given higher room temperature impact and lower sag values than the composition made by blending two prepolymers.

EXAMPLE 6

Prepolymer 6 (PP-6), having an NCO content of 15.4%, was prepared by the careful addition of 44.9 parts (0.0449 equiv.) of Polyamine D-2000 and 1 part of oleic acid to 38.5 parts (0.308 equiv.) of Polyisocyanate 1 and 16.6 parts (0.124 equiv.) of Polyisocyanate 2 being stirred at 80°±3° C., followed by reaction at that temperature for a further 30 minutes.

Polyisocyanate Composition 6 (PC-6), having an NCO content of 15.6%, was prepared by first adding 25.39 parts (0.0145 equiv.) of Polyether Polyol 1 to 49.2 parts (0.394 equiv.) of Polyisocyanate 1 being stirred at 80° C., the addition being performed at such a rate that the reaction temperature was maintained at 80°±3° C. The temperature was then raised to 90°±3° C. and 25.39 parts (0.0254 equiv.) of Polyamine D-2000 was slowly added, maintaining the temperature at 90°±3° C. After the addition was complete, this temperature was maintained for 150 minutes.

The reaction mixture was then cooled at 45° C., at which temperature 10 parts (0.0708 equiv.) of Polyisocyanate 3 were added to give a polyisocyanate composition based upon a polyamine and a polyol at an $NH_2/OH$ equivalents ratio of 1.25.

The prepolymer and the polyisocyanate composition were used in the preparation of RIM elastomers as described in Example 5. Further details and elastomer properties are given in the following Table.

| "A" Component | PP-6 | PC-6 |
| --- | --- | --- |
| A/B ratio | 211/100 | 209/100 |
| Hard block (%) | 69 | 69 |
| Flexural Modulus (MPa) | 772 | 1062 |
| Room temperature impact (Falling dart) (J) | 12 | 31 |
| −20° C. impact (J) (Falling dart) | 3.5 | 10.5 |
| Heat Sag (mm) (160° C., 1 hour) | 12 (12 cm O/H) | 21 (16 cm O/H) |

It can be seen that the polyisocyanate composition of the invention has given elastomers having higher modulus and impact values than the elastomers obtained from the polyamine based prepolymer.

EXAMPLE 7

Polyisocyanate Composition 7A (PC-7A), having an NCO content of 15.2%, was prepared from 49.11 parts (0.3929 equiv.) of Polyisocyanate 1, 17.84 parts (0.0102 equiv.) of Polyether Polyol 1, 33.13 parts (0.0331 equiv.) of Polyamine D-2000 and 10 parts (0.0708 equiv.) of Polyisocyanate 3 using the method described for Polyisocyanate Composition 6.

The product was based upon a polyamine and a polyol at an $NH_2/OH$ equivalents ratio of 3.25.

Using the same preparative method, Polyisocyanate Composition 7B (PC-7B), having an NCO content of 15.5%, was prepared from 48.85 parts (0.3908 equiv.) of Polyisocyanate 1, 33.45 parts (0.0191 equiv.) of Polyether Polyol 1, 18.0 parts (0.0180 equiv.) of Polyamine D-2000 and 10 parts (0.0708 equiv.) of Polyisocyanate 3.

The product was based upon a polyamine and a polyol at an $NH_2/OH$ equivalents ratio of 0.94.

The two polyisocyanate compositions and Polyisocyanate Composition 6 were used in the preparation of RIM elastomers using the "B" Component 2 at an NCO index of 115. A Krauss-Maffei RIMSTAR 155 machine was used with a mould temperature of 95° C. Further details and elastomer properties are given in the following Table.

| "A" Component | PC-7A | PC-6 | PC-7B |
|---|---|---|---|
| A/B ratio | 234/100 | 229/100 | 231/100 |
| Hard block (%) | 68 | 68 | 68 |
| Flexural Modulus (MPa) | 905 | 1115 | 979 |
| Room temperature impact (Falling dart) (J) | 64 | 65 | 71 |
| −20° C. impact (J) (Falling dart) | 10 | 36 | 14 |
| Heat Sag (mm) (16 cm O/H, 160° C., 1 hour) | 23 | 16 | 19 |

The Table shows that Polyisocyanate Composition 6, prepared from equal weights of polyol and polyamine, has given an elastomer having the best modulus, impact and sag properties.

EXAMPLE 8

Polyisocyanate Composition 8 (PC-8), having an NCO content of 15.5%, was prepared from 50.9 parts (0.407 equiv.) of Polyisocyanate 1, 24.55 parts (0.0245 equiv.) of Polyether Polyol 2, 24.55 parts (0.0245 equiv.) of Polyamine D-2000 and 10 parts (0.0708 equiv.) of Polyisocyanate 3 using the method described for Polyisocyanate Composition 6.

The product was based upon a polyamine and a polyol at an $NH_2/OH$ equivalents ratio of 1.0 but is not a polyisocyanate composition of the invention because Polyether Polyol 2 has a nominal hydroxyl functionality of 2.

The polyisocyanate composition and Polyisocyanate Composition 6 were used in the preparation of RIM elastomers as described in Example 7. Further details and elastomer properties are given in the following Table.

| "A" Component | PC-8 | PC-6 |
|---|---|---|
| A/B ratio | 230/100 | 229/100 |
| Hard block (%) | 69 | 68 |
| Flexural Modulus (MPa) | 754 | 1115 |
| Room temperature impact (Falling dart) (J) | 72 | 65 |
| −20° C. impact (J) (Falling dart) | 30 | 36 |
| Heat Sag (mm) (16 cm O/H, 160° C., 1 hour) | >50 (Fail) | 16 |

The Table shows that Polyisocyanate Composition 6 containing a polyether triol has given an elastomer superior in modulus, low temperature impact and heat sag compared with the elastomer prepared from Polyisocyanate Composition 8 containing a polyether diol.

EXAMPLE 9

Polyisocyanate Composition 9, having an NCO content of 15.0%, was prepared from 49.2 parts (0.3936 equiv.) of Polyisocyanate 1, 25.90 parts (0.0148 equiv.) of Polyether Polyol 1, 24.90 parts (0.0249 equiv.) of Polyamine D-2000 and 10 parts (0.0708 equiv.) of Polyisocyanate 3 using the method described for Polyisocyanate Composition 6.

The product was based upon a polyamine and a polyol at an $NH_2/OH$ equivalents ratio of 1.68.

This polyisocyanate composition was used in the preparation of RIM elastomers using "B" Component 2 and "B" Component 3, at an NCO index of 105. In other respects, the elastomers were prepared as described in Example 7. Further details and elastomer properties are given in the following Table.

| "B" Component | 3 | 2 |
|---|---|---|
| A/B ratio | 240/100 | 265/100 |
| Hard block (%) | 68 | 68 |
| Flexural Modulus (MPa) | 800 | 912 |
| Room temperature impact (Falling dart) (J) | 38 | 39 |
| −20° C. impact (J) (Falling dart) | 15 | 21 |
| Heat Sag (mm) (12 cm O/H, 160° C., 1 hour) | 9 | 14 |

The Table shows that "B" Component 2 containing an imine has given higher modulus and low temperature impact figures than "B" Component 3 containing an amine.

EXAMPLE 10

A RIM elastomer was prepared by reacting Polyisocyanate Composition 5B with a "B" Component comprising 60 parts of an iso-urea prepared from a polypropylene glycol and N,N'-dicyclohexylcarbodiimide and 40 parts of DETDA at an NCO index of 105. A Battenfeld SHK-65 RIM machine was used with a mould temperature of 100° C. Further details and elastomer properties are given in the following Table.

| A/B ratio | 164/100 |
|---|---|
| Hard block (%) | 46 |
| Flexural Modulus (MPa) | 579 |
| Room temperature impact (Falling dart) (J) | 4 |
| −20° C. impact (J) (Falling dart) | 2 |
| Heat Sag (mm) (12 cm O/H, 160° C., 1 hour) | 6.5 |

The isourea-terminated polyether was prepared in the following manner.

5000 g of PPG 2000 (Polyether Polyol 2) (2.5 moles), 1289.0 g of DCC (6.25 moles) and 12.5 g of Cu(I)Cl as catalyst were charged to a ten liter reactor which had been fitted with a mechanical stirrer, nitrogen sparge, and temperature control thermocouple. The temperature was set to 130° C. The progress of the reaction was monitored by IR analysis by means of the reduction of a broad OH band at 3500 $CM^{-1}$ which indicated the consumption of PPG 2000, the reduction of a peak at 2130 $cm^{-1}$ which indicated the consumption of DCC, and the growth of a peak at 1660 $cm^{-1}$ which indicated formation of isourea end groups. An IR spectrum taken after 110 minutes indicated that the reaction had started.

After 1210 minutes another gram of catalyst was added since an IR spectrum indicated that the rate of reaction had slowed greatly. After 1475 minutes an IR spectrum showed no further reduction in the OH peak so the reaction was considered complete and the heat was turned off after 1490 minutes.

EXAMPLE 11

A RIM elastomer was prepared by reacting polyisocyanate composition 5B with a "B" component comprising 60 parts of a guanidine prepared from a polyoxypropylene triamine and N,N'-dicyclohexylcarbodiimide and 40 parts of DETDA using the procedure of Example 10.

Further details and elastomer properties are given in the following Table.

| A/B ratio | 158/100 |
|---|---|
| Hard block (%) | 46 |
| Flexural Modulus (MPa) | 592 |
| Room temperature impact (Falling dart) (J) | 53 |
| −20° C. impact (J) (Falling dart) | 36 |
| Heat Sag (mm) (16 cm O/H, 160° C., 1 hour) | 19 |

The guanidine-terminated polyether was prepared by reacting 7500 g (1.5 moles) of Polyamine T-5000, 770.6 g (3.74 moles) of N,N'-dicyclohexylcarbodiimide and 7.5 g copper (I) chloride at 130° C. for 17.5 hours.

EXAMPLE 12

Polyisocyanate Composition 12, having an NCO content of 15.3%, was prepared by the careful addition of a mixture of 37.3 parts (0.0373 equiv.) of Polyamine D-2000 and 6.6 parts (0.0066 equiv.) of Polyamine T-3000 to 56.14 parts (0.449 equiv.) of Polyisocyanate 1 at 80°±3° C. After completion of the addition, the reaction was continued for a further 30 minutes at the same temperature.

The polyisocyanate composition was used in the preparation of a RIM elastomer using "B" Component 3 and the procedure described in Example 10. Further details and elastomers properties are given in the following Table.

| A/B ratio | 234/100 |
|---|---|
| Hard block (%) | 69 |
| Flexural Modulus (MPa) | 983 |
| Room temperature impact (Falling dart) (J) | 0.60 |
| −20° C. impact (J) (Falling dart) | <0.50 |
| Heat Sag (mm) (16 cm O/H, 160° C., 1 hour) | 9.5 |

Polyisocyanate Composition 12, containing no polyol component, is not a composition according to the invention. The derived elastomer has very poor impact properties.

EXAMPLE 13

For comparison, a RIM elastomer was prepared from Polyisocyanate Composition 12 and "B" Component 2 at an NCO index of 115 using the procedure described in Example 10. Further details and elastomer properties are given in the following Table.

| A/B ratio | 213/100 |
|---|---|
| Hard block (%) | 70 |
| Flexural Modulus (MPa) | 1084 |
| Room temperature impact (Falling dart) (J) | 2.3 |
| −20° C. impact (J) (Falling dart) | <0.5 |
| Heat Sag (mm) (16 cm O/H, 160° C., 1 hour) | 27 |

It can be seen that although the elastomer has a high modulus value, it exhibits poor impact and heat sag properties.

EXAMPLE 14

A RIM elastomer was prepared from Polyisocyanate Composition 5B and "B" Component 4 using the procedure of Example 10. Further details and elastomer properties are given in the following Table.

| A/B ratio | 167/100 |
|---|---|
| Hard block (%) | 46 |
| Flexural Modulus (MPa) | 423 |
| Room temperature impact (Falling dart) (J) | 12 |
| −20° C. impact (J) (Falling dart) | 12 |
| Heat Sag (mm) (12 cm O/H, 160° C., 1 hour) | 1 |

We claim:

1. A liquid polyisocyanate prepolymer composition having a free-NCO content in the range of 8–25 percent by weight comprising a reaction product under substantially anhydrous conditions of a stoichiometric excess of an organic polyisocyanate and:
   (I) a polymeric polyol having an average nominal hydroxyl functionality greater than 2 and an average hydroxyl equivalent weight of from about 500 to about 5000, and
   (II) a polymeric polyamine having an average nominal primary and/or secondary amino functionality of from about 2 to about 3 and an average amine equivalent weight of from about 500 to 5000, the polyol and the polyamine having glass transition temperature below room temperature,
   whereby the ratio of —NCO groups on said organic polyisocyanate to the hydroxyl and amino groups on said polyol and said polyamine range from about 4.5:1 to about 35:1 and the relative proportions of polyol and polyamine correspond to an initial hydroxyl to amino group ratio in the range of 5:95 to 95:5.

2. A composition according to claim 1 wherein the organic polyisocyanate comprises 4,4'-diphenylmethane diisocyanate, 2,4'-diphenylmethane diisocyanate or a mixture thereof.

3. A composition according to claim 1 or claim 2 wherein the average nominal hydroxyl functionality of the polyol is in the range from 2.5 to 4.

4. A composition according to claim 3 wherein the average nominal hydroxyl functionality of the polyol is about 3.

5. A composition according to claim 1 wherein the average hydroxyl equivalent weight of the polyol is in the range from 800 to 2000.

6. A composition according to claim 1 wherein the polyol is a polyether polyol.

7. A composition according to claim 6 wherein the polyether is a polyoxypropylene or poly(oxyethyleneoxypropylene) triol.

8. A composition according to claim 1 wherein at least 70% of the amino groups in the polymeric polyamine are primary amino groups.

9. A composition according to claim 1 wherein the average nominal amino functionality of the polyamine is in the range from 2.5 to 3.

10. A composition according to claim 1 wherein the average amine equivalent weight of the polyamine is in the range from 800 to 2000.

11. A composition according to claim 10 wherein the average amine equivalent weight is in the range from 800 to 1700.

12. A composition according to claim 1 wherein the polyamine is a polyether polyamine.

13. A composition according to claim 12 wherein the polyether is a polyoxypropylene diamine or triamine.

14. A composition according to claim 1 wherein the NCO content is in the range from 12 to 20.

15. A composition according to claim 1 comprising the product obtained by reacting the excess of organic polyisocyanate with a mixture of the polymeric polyol and the polymeric polyamine or sequentially with the polymeric polyol and the polymeric polyamine or with the polymeric polyamine and the polymeric polyol.

16. A composition according to claim 15 comprising the product obtained by reacting the excess of organic polyisocyanate with the polymeric polyol to form an isocyanate terminated polyol based prepolymer and subsequently reacting the prepolymer with the polymeric polyamine.

17. A composition according to claim 1 wherein the hydroxyl to amino group ratio is in the range from 25:75 to 75:25.

18. A composition according to claim 17 wherein the hydroxyl to amino group ratio is in the range from 35:65 to 65:35.

* * * * *